(12) United States Patent
Perrett

(10) Patent No.: US 9,172,614 B2
(45) Date of Patent: Oct. 27, 2015

(54) NETWORK CAPACITY MANAGEMENT SYSTEM AND METHOD

(75) Inventor: Jay Perrett, Calne (GB)

(73) Assignee: ARIA NETWORKS LIMITED, Chippenham (GB)

( * ) Notice: Subject to any disclaimer, the term of this patent is extended or adjusted under 35 U.S.C. 154(b) by 98 days.

(21) Appl. No.: 14/238,032

(22) PCT Filed: Aug. 8, 2012

(86) PCT No.: PCT/GB2012/051947
§ 371 (c)(1),
(2), (4) Date: Feb. 10, 2014

(87) PCT Pub. No.: WO2013/024269
PCT Pub. Date: Feb. 21, 2013

(65) Prior Publication Data
US 2014/0177476 A1 Jun. 26, 2014

(30) Foreign Application Priority Data
Aug. 12, 2011 (GB) .................................. 1113886.4

(51) Int. Cl.
*H04L 12/26* (2006.01)
*H04L 12/24* (2006.01)

(52) U.S. Cl.
CPC ............ *H04L 41/12* (2013.01); *H04L 41/0856* (2013.01); *H04L 41/145* (2013.01); *H04L 41/16* (2013.01)

(58) Field of Classification Search
None
See application file for complete search history.

(56) References Cited

U.S. PATENT DOCUMENTS

| 5,598,532 A | 1/1997 | Liron |
| 7,092,378 B1 | 8/2006 | O'Neil |
| 2003/0145110 A1* | 7/2003 | Ohnishi et al. ................ 709/242 |
| 2006/0031444 A1 | 2/2006 | Drew |

(Continued)

OTHER PUBLICATIONS

Bassam Al-Bassam et al: "A tutorial on using genetic algorithms for the design of network topology", International Journal of Network Management, vol. 16, No. 4, Jan. 1, 2006, pp. 253-262, XP55043131, ISSN: 1055-7148, DOI: 10.1002/nem.597.

(Continued)

*Primary Examiner* — Chi H Pham
*Assistant Examiner* — Soon-Dong D Hyun
(74) *Attorney, Agent, or Firm* — Edouard Garcia

(57) ABSTRACT

A network capacity management system and method are disclosed. The system (10) includes a first data repository (20) encoding topology definition data, the topology definition data comprising data on topology elements of a network and including data on capacity of a respective topology element, a second data repository (30) encoding service consumption data, the service consumption data comprising data on service elements associated with a network and including data on capacity requirements associated with a respective service element, a network definition component (40) operable generate a network definition from the topology definition data and the service consumption data, the network definition encoding capacity criteria determined from said data on capacity of the respective topology elements and from data on capacity requirements of the respective service elements and an optimization component (50) operable to process said network definition in dependence on one or more predetermined optimization criteria to optimize said network definition based on said optimization criteria and on said capacity criteria.

17 Claims, 11 Drawing Sheets

(56) References Cited

U.S. PATENT DOCUMENTS

2007/0067296 A1* 3/2007 Malloy et al. .................. 707/8
2007/0230369 A1* 10/2007 McAlpine .................. 370/256
2009/0257446 A1* 10/2009 Zhao .......................... 370/468
2010/0202312 A1* 8/2010 Eswaran .................... 370/252
2011/0085445 A1* 4/2011 Klincewicz et al. ......... 370/238
2012/0087377 A1* 4/2012 Lai ............................. 370/427

OTHER PUBLICATIONS

International Search Report issued in International Application No. PCT/GB2012/051621, dated Nov. 15, 2012.

* cited by examiner

Fig. 6

```
capacity_group_template {
   name: "an_test1_type0"
   version: "1.0"
   description: ""
   cost:100
   type: NODE
   capacity {
      description: ""
      name: "cap1"
      free: 100
      consumption_set {
         consumption { name: "cap1" value: 1 }
      }
   }
   children {
      select: ALL
      capacity_group_template {
         select: MOST_UTILISED
         name: "an_test1_type1"
         free: 4
         infill: 4
      }
   }
}
```

NETWORK CAPACITY MANAGEMENT SYSTEM AND METHOD

CROSS-REFERENCE TO RELATED APPLICATIONS

This application is the National Stage of International Application No. PCT/GB2012/051947, filed Aug. 10, 2012, which claims the benefit of British Application No. 1113886.4, filed Aug. 12, 2011.

FIELD OF THE INVENTION

The present invention relates to a network capacity management system and method that is particularly applicable capacity management of transport networks including, for example, data communications networks and physical transport networks such as rail and/or road networks.

BACKGROUND TO THE INVENTION

Networks exist in many different forms. A network can be considered to be defined by its underlying topology and any associated policies imposed on use of that topology. The same combination of components can often be implemented in many different ways, each implementation potentially resulting in networks offering vastly different capacities, redundancy etc.

Capacity management is often used to describe techniques and actions used by network administrators to plan for network growth, expected or unexpected topology failures and also to explore possible network optimisations to ensure that the network will meet projected needs.

Network topologies can be defined at many different levels of granularity and this has a knock-on effect on capacity management. If a network topology is defined too generically, insufficient information is typically available to enable a network to be analysed and optimised. However, defining the potentially tens of thousands of nodes, links, interrelationships, constraints and other factors that may make up (or be used to make up) a network topology can be exceptionally costly and time consuming any may then present too much information for an analysis or optimisation system to sensibly utilise and produce a result in an acceptable timeframe.

Tools and systems are available at varying levels of complexity, price and performance. At their most simplistic level, modelling tools may include a toolbox of components that can be used to build models. If a network can be made to fit the toolbox then such tools can be of use. However, it is often the case that the toolbox can only accurately represent the network at its most abstract and generic level. Moving beyond such tools typically requires a bespoke definition to meet the requirements of the particular optimisation tool or system in which it is to be used.

An alternative to modelling is to use real networks or data captured from real networks. Of course, this requires that the network exists in the configuration and under the conditions needed for analysis. In many situations it does not (and even if it does, that does not imply that the network can be taken out of service or can accommodate testing in addition to its current functions).

STATEMENT OF THE INVENTION

According to an aspect of the present invention, there is provided a network capacity management system comprising:

a first data repository encoding topology definition data, the topology definition data comprising data on topology elements of a network and including data on capacity of a respective topology element;

a second data repository encoding service consumption data, the service consumption data comprising data on service elements associated with a network and including data on capacity requirements associated with a respective service element;

a network definition component operable generate a network definition from the topology definition data and the service consumption data, the network definition encoding capacity criteria determined from said data on capacity of the respective topology elements and from data on capacity requirements of the respective service elements;

an optimisation component operable to process said network definition in dependence on one or more predetermined optimisation criteria to optimise said network definition based on said optimisation criteria and on said capacity criteria.

The topology definition data may include data on constraints associated with a respective topology element and the service consumption data includes data on constraints associated with a respective service element, the network definition component being operable to encode constraint criteria in said network definition, the constraint criteria being determined from said data on constraints on the respective topology and service elements, and, the optimisation component being operable to process said network definition to optimise said network definition based on constraint criteria.

The network capacity management system may further comprise a scenario definition component operable to receive inputs on a scenario, wherein the optimisation component is operable to process the network definition in dependence on the scenario.

The optimisation component may include an evolution engine operable to apply a selected one of a neural network, genetic programming or a genetic algorithm to optimise the network definition.

The optimisation component may include an interface operable to communicate with an evolution engine to optimise the network definition.

The optimisation component may be operable to calculate a fitness value for the network definition for each evolution of the evolution engine, the evolution engine being operable to perform subsequent optimisation of the network definition in dependence on said fitness value.

The fitness value may be calculated in dependence on said optimisation criteria and on said capacity criteria.

The network definition component may be operable to determine a network representation from said topology and service elements.

The network definition component may be arranged to receive inputs from a user via a graphical user interface for selecting at least a subset of the topology and service elements for the network representation.

The network definition component may be arranged to generate said network definition in dependence on data on an existing network.

The data on capacity may include data on existing capacity. The data on existing capacity may include data on utilised existing capacity. The data on capacity may include data on infill capacity, infill capacity comprising capacity creatable by allocation of a resource. The service consumption data may include data on routing requirements associated with a respective service element, the optimisation component being operable to optimise said network definition in dependence on said routing requirements.

The network definition may include a route utilising at least selected ones of the topology elements and being associated with a respective service element, the optimisation component being operable to optimise said route in dependence on said optimisation criteria and on said capacity criteria.

The system may further comprise a memory encoding data on decision weighting, the network capacity management system being arranged to record, for evolutions of said evolution engine, an optimisation selected in for evolution and a weighting value determined in dependence on a fitness value calculated for said optimised network definition for said evolution, the optimisation component being arranged to direct subsequent optimisation of the network definition by said evolution engine in dependence on said weighting value.

The topology definition data for a topology element may comprise a hierarchy of topology definition data for each of one or more child topology elements, each child topology element comprising a sub-element of the topology element, said hierarchy encoding dependencies between the respective elements in the hierarchy.

The topology definition data may include data defining relationships between non-hierarchically linked topology elements.

According to another aspect of the present invention, there is provided a capacity computation engine operable to interface with a network optimisation evolution engine, the network optimisation evolution engine optimising a network definition for the network by iterative evolution of the network definition, the capacity computation engine comprising:
a network definition component operable to generate the network definition for the network from data on topology elements and service requirements of said network, the network definition component being arranged to encode, in said network definition, capacity data in dependence on capacity of the respective topology elements and on capacity requirements of the respective service elements;
a network capacity computation component operable, for each iterative evolution of the evolution engine, to calculate a fitness value of the evolved network definition and to direct subsequent operation of said evolution engine in dependence on said fitness value.

According to another aspect of the present invention, there is provided a network analysis method comprising:
storing topology definition data, the topology definition data comprising data on topology elements of a network and including data on capacity of a respective topology element;
storing service consumption data, the service consumption data comprising data on service elements associated with a network and including data on capacity requirements associated with a respective service element;
generating a network definition defining the network, the network definition being generated from the topology definition data and the service consumption data, the network definition encoding capacity criteria determined from said data on capacity of the respective topology elements and from data on capacity requirements of the respective service elements;
determining a service route across the network; and,
cross-referencing the service route with the network definition to determine consumption of said capacity by said service route.

The topology definition data may include data on constraints associated with a respective topology element and the service consumption data includes data on constraints associated with a respective service element,
the method further comprising:
determining constraint criteria from said data on constraints on the respective topology and service elements;
encoding said constraint criteria in said network definition; and,
processing said network definition to optimise said network definition based on said constraint criteria.

The method may further comprise:
receiving inputs on a scenario; and,
processing the network definition in dependence on the scenario.

The method may further comprise applying a selected one of a neural network, genetic programming or a genetic algorithm to optimise the service route over a number of evolutions in dependence on capacity consumption.

The method may further comprise communicating with an evolution engine to optimise the network definition over a number of evolutions.

The method may further comprise:
calculating a fitness value for the network definition for each evolution,
performing subsequent optimisation in dependence on said fitness value.

The method may further comprise calculating the fitness value in dependence on said optimisation criteria and on said capacity criteria.

The step of generating network definition may include determining at least parts of the network representation from said topology and service elements.

The method may further comprise receiving inputs from a user via a graphical user interface for selecting at least a subset of the topology and service elements for the network representation.

The step of determining the network definition may include generating at least parts of said network definition in dependence on data on an existing network. The data on capacity may include data on existing capacity. The data on existing capacity may include data on utilised existing capacity. The data on capacity may include data on infill capacity, infill capacity comprising capacity creatable by allocation of a resource.

The service consumption data may include data on routing requirements associated with a respective service element, the method including optimising said network definition in dependence on said routing requirements.

The network definition may include a route utilising at least selected ones of the topology elements and being associated with a respective service element, the method further comprising optimising said route in dependence on said optimisation criteria and on said capacity criteria.

The method may further comprise:
recording, for said evolutions, an optimisation selected for said evolution and a weighting value determined in dependence on a fitness value calculated for a result of said optimisation; and,
directing subsequent evolutions in dependence on said weighting value.

The topology definition data for a topology element may comprise a hierarchy of topology definition data for each of one or more child topology elements, each child topology element comprising a sub-element of the topology element, said hierarchy encoding dependencies between the respective elements in the hierarchy.

The topology definition data may include data defining relationships between non-hierarchically linked topology elements.

WO 2011/036500, which is commonly owned by the applicant and is herein incorporated by reference, is directed to an apparatus for determining an optimum path in a multi-layer network. Optimisation problems such as that set out in this document can be addressed in a number of ways. When used in combination with embodiments of the present invention, the networks can be defined and analysed to high degrees of granularity and the optimum path (or optimum network to provide the optimum path) can be more accurately determined both in terms of both layer based analysis and on capacity consumption.

Embodiments of the present invention seek to provide systems and methods for improved network control, inventory management, network optimisation and planning. Such systems can have broad goals such as bandwidth management, increasing efficiency, reducing cost overheads or they may have more focussed goals such as in the case of telecommunication networks: optimising links or sub-networks to meet service level objectives; ensuring network survivability in a disaster situation, predicting the impact of failing nodes, links, or resource groups; identifying most effective use of a budget to improve factors within an existing network or create a new network; automatically design network topologies based on user-configurable priorities for cost, resiliency, and performance-related criteria; optimize routing and security for networks; verify the impact of protocol tuning, QoS deployment, or traffic engineering.

BRIEF DESCRIPTION OF THE DRAWINGS

Embodiments of the present invention will now be described in detail with reference to the accompanying drawings in which:

FIGS. 4 to 6 are detailed representations of selected elements of FIGS. 2 and 3;

DETAILED DESCRIPTION

Figure 1:
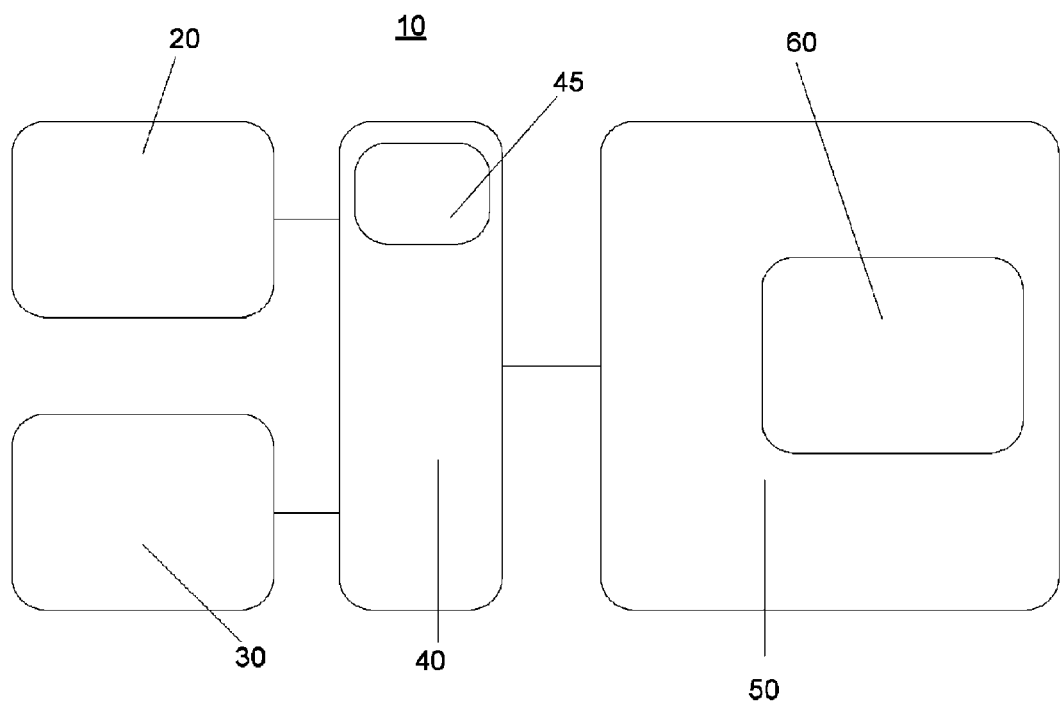
FIG. 1 is a schematic diagram of a network capacity management system according to an embodiment of the present invention.

FIG. 1 is a schematic diagram of a network capacity management system according to an embodiment of the present invention.

The network capacity management system 10 includes a first data repository 20, a second data repository 30, a network definition component 40 and an optimisation component 50.

The first data repository 20 encodes topology definition data, the topology definition data comprising data on topology elements of a network and including data on capacity of a respective topology element. The second data repository 30 encodes service consumption data, the service consumption data comprising data on service elements associated with a network and including data on capacity requirements associated with a respective service element.

The network definition component 40 is operable to generate a network definition from the topology definition data and the service consumption data. The network definition encodes capacity criteria determined from said data on capacity of the respective topology elements and from data on capacity requirements of the respective service elements.

The optimisation component 50 is operable to process the network definition in dependence on one or more predetermined optimisation criteria to optimise the network definition based on the optimisation criteria and on the capacity criteria. Preferably, an evolution engine 60 is used for at least part of the optimisation process as is discussed in greater detail below.

In one embodiment, the network definition component may optionally include a graphical user interface 45 in which a network representation can be created and/or manipulated. A network representation may be created as an intermediate stage, the representation being a user-friendly (typically visual) representation of a network definition. Topology and service elements in such an embodiment may be dragged and dropped or otherwise drawn or added to the graphical environment to create the network representation.

It will be appreciated that the network representation could be obtained from a local or remote source instead of being created from scratch. In addition, the network representation need not necessarily be created using a graphical user interface and could instead be created automatically from results of a network analyser or other tool or created from a text-based environment or an environment based on both text and graphical manipulation.

The first and second data repositories may be in the form of databases, hard disks, distributed storage network or other forms of storage repositories. The repositories may be separate, may be combined or may co-exist on common hardware. The components described herein may be implemented in hardware, firmware or software executed on a suitably configured computer or computer system.

Figure 2:
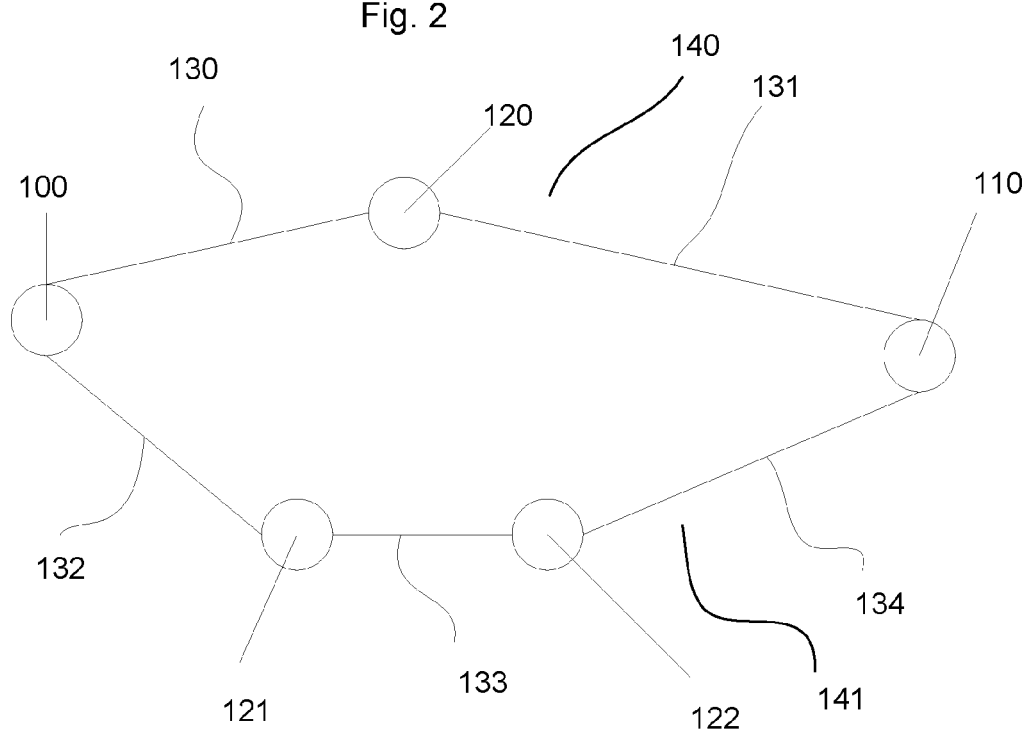
FIG. 2 is a schematic diagram of a network representation produced by an embodiment of the present invention.

FIG. 2 is a schematic diagram of a network representation produced by an embodiment of the present invention. The network representation includes a start node 100, a destination node 110 and intermediate nodes 120-122 connected by links 130-134 defining a first path 140 and a second path 141.

The term "node" is used to refer to a terminal point or an intersection point of a network. Depending on the level of abstraction, it may refer to a topology element such as a location in a network, a system, a piece of equipment or an individual component. Examples of node type topology elements include: abstract elements such as locations and systems (such as a telephony exchange); physical elements such as a router, switch, terminal, hub, branch, intersection or the like; and virtual elements such as channels.

The term "link" is used to refer to a topology element providing a connection between two nodes. A link is the abstraction of a transport infrastructure supporting connections between nodes. Examples of link type topology elements may include: physical elements such as a cable, a pipe or a road; abstract elements such as a network link; and virtual elements such as a channel or frequency of a link or cable.

Data on each topology element type is stored in the form of a respective template in the first data repository 20. The data may include:

Current capacity. Current capacity is preferably divided into overall capacity of the topology element and available (unused) capacity of the topology element.

Infill capacity. Infill capacity is a measure of the expansion capability of the topology element. For example, a node may have ports available to connect to yet to be provisioned links; a chassis may have slots available for yet to be provisioned cards; a pipeline may have space for further cables.

Dependency data. Preferably, topology elements are each defined hierarchically as is discussed in more detail below. Dependency data allows the hierarchy in terms of an inventory of resources/equipment, their structure and inter-relationship to be described.

Capacity (both current and infill) at a node may include items such as:

Number of slots
Number of cards
Number of ports
Bandwidth

Capacity (again, both current and infill) at a link may include items such as:

Fibre
Wavelength
Bandwidth
Number of channels

A capacity can be used to represent anything that is consumable by a service. In addition to examples above, capacity may be used, for example, to give a measure of equipment space, power consumption, size of a rack that accommodates equipment or connectors.

Figure 4:
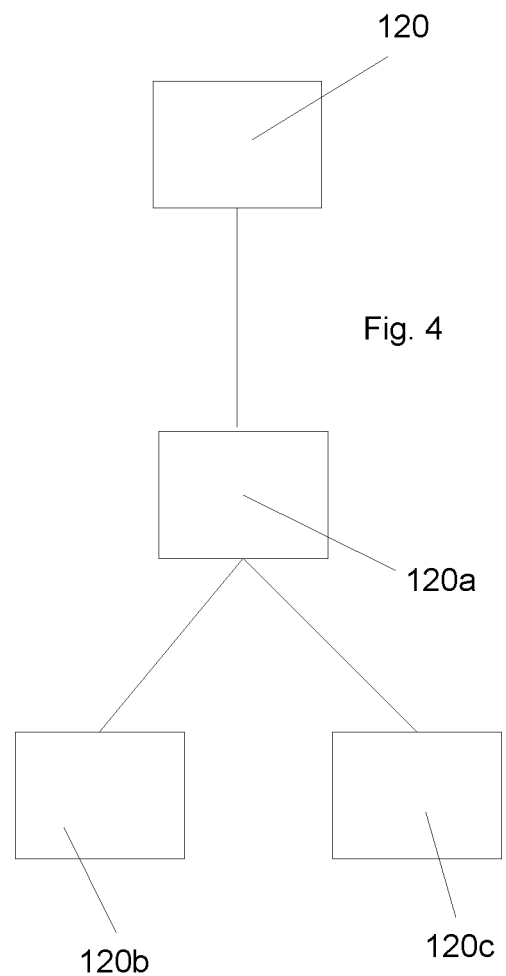

Dependency data typically refers to the "vertical" relationships within a hierarchy of inventories of a topology element (see for example FIG. 4). However, there may be instances where other dependency relationships also must be defined. For example, in importing brownfield topology data (data on an existing network with existing dependencies) to present a calculated service that consumes inventories, "parallel" relationships between inventories of different topology elements (i.e., node and link—which link inventory is connected to which node inventory) are also handled as a part of dependency data. Both dependency types are considered in handling "instantiated" inventories, such as existing utilised topology and/or consumed capacities by a calculated service.

Preferably, the topology definition data is encoded in a representation that allows a common syntax to be used for any topology element or topology element type. In a preferred embodiment, the topology definition data is encoded in a structured language representation in which the various attributes of nodes and links can be described at any level of abstraction or detail. Examples of the structured language representation are discussed below.

The service consumption data defines templates of service types that may be provided by, or may use, a network. Each template describes how the particular type of service should consume resource capacity. It may also optionally describe what constraints and rules apply, and whether there is any consequential need for additional services to support this service.

The service consumption data may include:
Topology element(s) required by the service;
Capacity to be Consumed;
Conditions in consuming capacity
Capacity disjoint requirement (for example, two services may be required to use, for instance, a port of a same type but from different cards of telecommunications equipment. This is common to achieve service redundancy in telecommunications. A service criteria that specifies to consume different inventories/capacities is called Capacity Disjoint).

Routing disjoint (backup service) requirement (Routing Disjoint criteria involves more than one services. Routing Disjoint requires that the specified services do not share the whole path (i.e., node and link) or specific topology element (e.g., node or link) along the service routes. For instance, if two disjoint services are routed over 140 and 141 in FIG. 2, the routing disjoint is satisfied. Routing Disjoint is also common to achieve service redundancy in telecommunications).

Routing disjoint and capacity disjoint are of disjoint service constraint at different levels, and so it is possible to specify both in combination or either one of them.

The topology definition data may also include data on constraints associated with a respective topology element. Similarly, the service consumption data may include data on constraints associated with a respective service element. Where there are associated constraints, the network definition component is arranged to encode constraint criteria in the network definition and the optimisation component is arranged to optimise the network definition taking into account the constraint criteria.

Depending on the particular topology elements selected, the network representation may be an abstraction of the actual network. Take, for example, the schematic diagram of FIG. 3. In this diagram, intermediate node 120 is now shown as including a number of sub-nodes 120a-120c which can also take part in the optimisation.

Preferably, the topology and service consumption data are stored as inter-related templates, each corresponding to a particular topology element, service element etc. The templates are preferably defined as a hierarchy such that sub-elements/components/services can be separately defined in the first data repository 20 and then, at instantiation, linked to respective higher level "parent" element instance.

Figure 3:
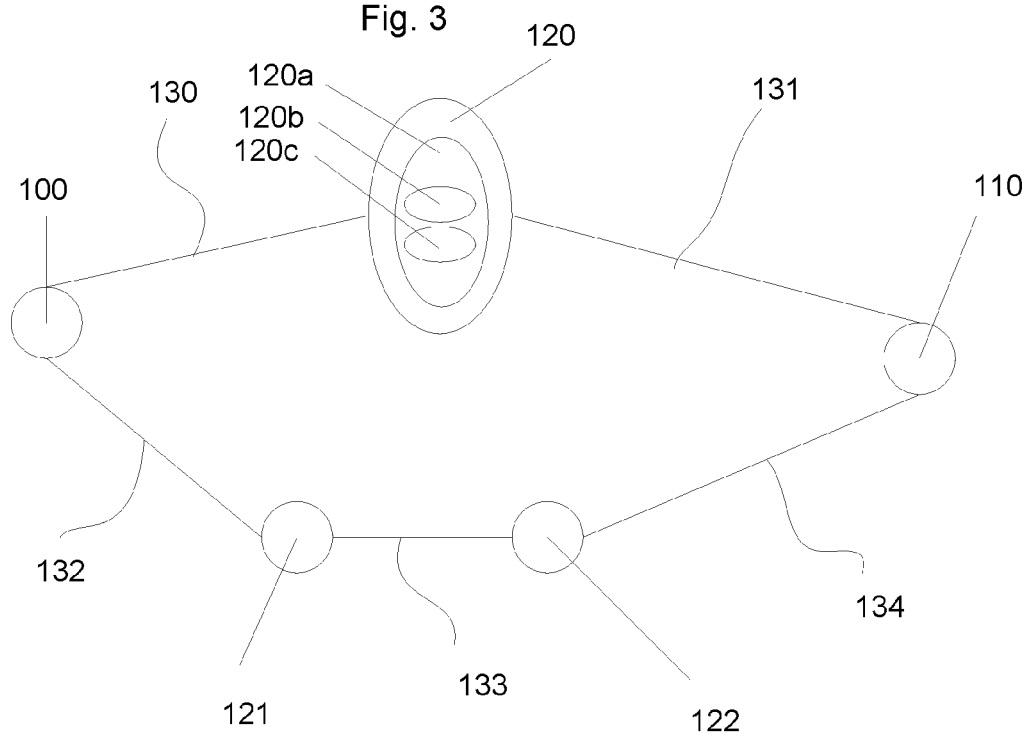
FIG. 3 is the schematic diagram of the network representation of FIG. 2 illustrating selected elements in more detail.
Figure 5:
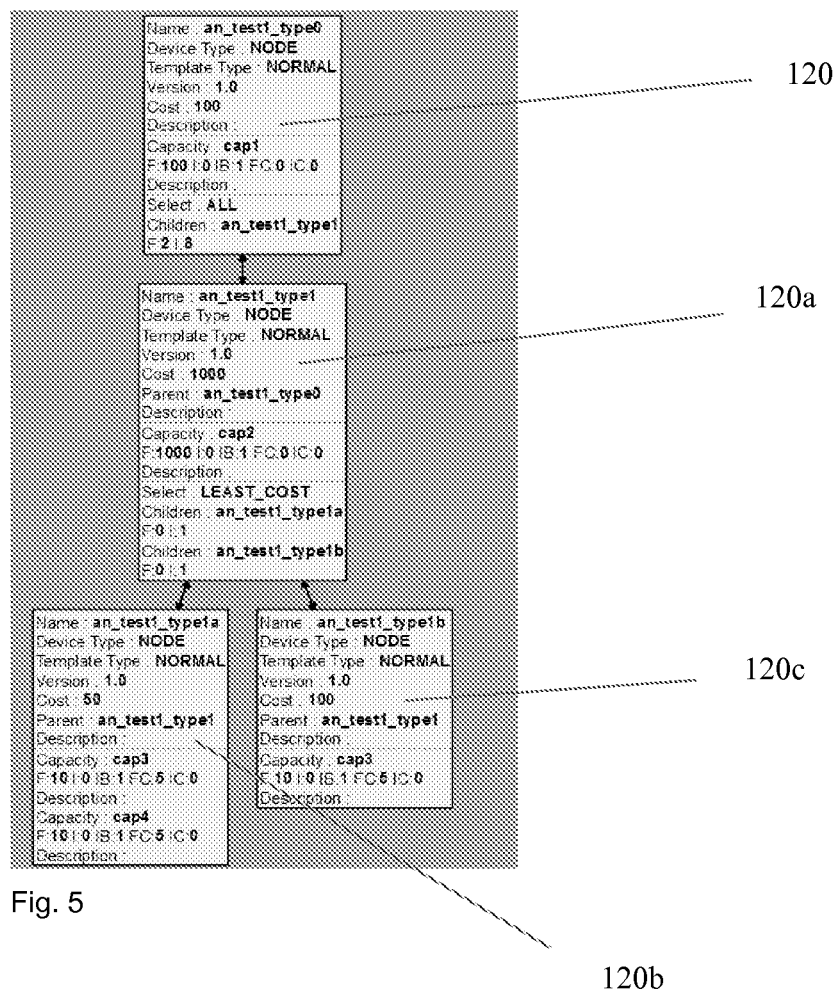

For example, the intermediate node 120 shown in FIG. 2 and then in more detail in FIG. 3 may be a router. This is considered to be a type 0 element (it is the highest level of abstraction and has no parent). The sub-elements 120a may be a switch within the router. This is a type 1 element and a child of the type 0 element. Sub-elements 120b and 120c may be ports available to the switch. These are type 1a and 1b elements, respectively. They are designated as being different types as the elements themselves are different or have different properties/costs. As is shown in FIG. 5, element 120b has a cost of "50" whilst element 120c has a cost of "100". This is discussed in more detail below but in summary indicates to the optimisation component that there is a higher cost (by a factor of 2 in this example) of using element 120c than 120b.

Each element and sub-element has a corresponding template in the first data repository. To generate a network definition, the network definition component 40 obtains the corresponding template for each topology element from the first data repository 20 and populates the template with details of the element to create an instance as shown in FIG. 5.

Where applicable the template for each node preferably identifies its parent and children. The graphical illustration of FIG. 5 is to aid visualisation only as in use the structure of the hierarchy can be derived from the parent/children labels for each element. In a preferred embodiment, each template and template instance is defined using a structured language representation, an example of which is shown in FIG. 6 for the type 0 node.

The hierarchy defined between elements sets capacities and conditions of the elements as follows:

In the case of FIG. 6, the type 0 node (120):
has no dependency (and so is not conditional on another element already existing in the network definition);
is required when creating a type 1 node;
when created, has 4 type 1 nodes installed and ready to be consumed; has infill capacity to hold an additional 4 type 1 nodes.

The type 1, 1a and 1b nodes will be similarly defined using the same semantics.

Topology definition data (included in data repository 20) can specify capacity at varying levels of granularity in the hierarchy of a topology element. This then enables the ability of define a level of granularity of consumption. For instance in FIG. 5, a user can specify either type 0, 1, 1a or 1b in order to consume "cap3" for a service. When type 0 is specified, the optimisation component searches down the inventory 'tree' until finding an appropriate inventory (this case type 1a/1b) that can hold the specified "cap3" capacity.

Service consumption templates are processed and instantiated in the same manner. However, the service template is generally dependent on an underlying network topology and the type of data in the template reflects this. A service consumption template may specify:

consume_capacity_group: This identifies all the topology elements that will be consumed by the service in this Node or Link object's inventory.
select: A select statement is included where a choice from several options is available;
of_template: This names a specific topology element type to be consumed and contains a list of use_capacity commands to identify how each capacity within the topology element is used.
use_capacity: For a named capacity within the target topology element, specify how many units are to be used by this service.

Figure 7:
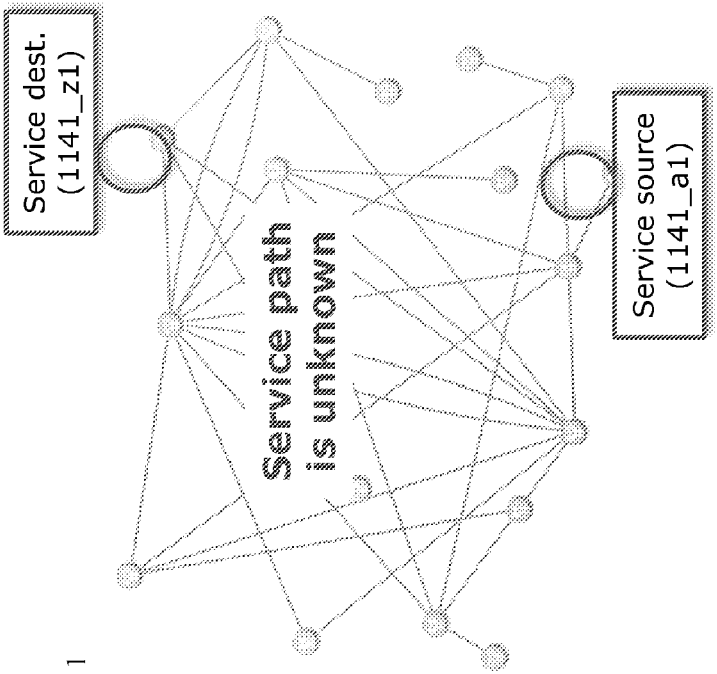
FIG. 7 is a graphical representation of a network definition.
Figure 7:
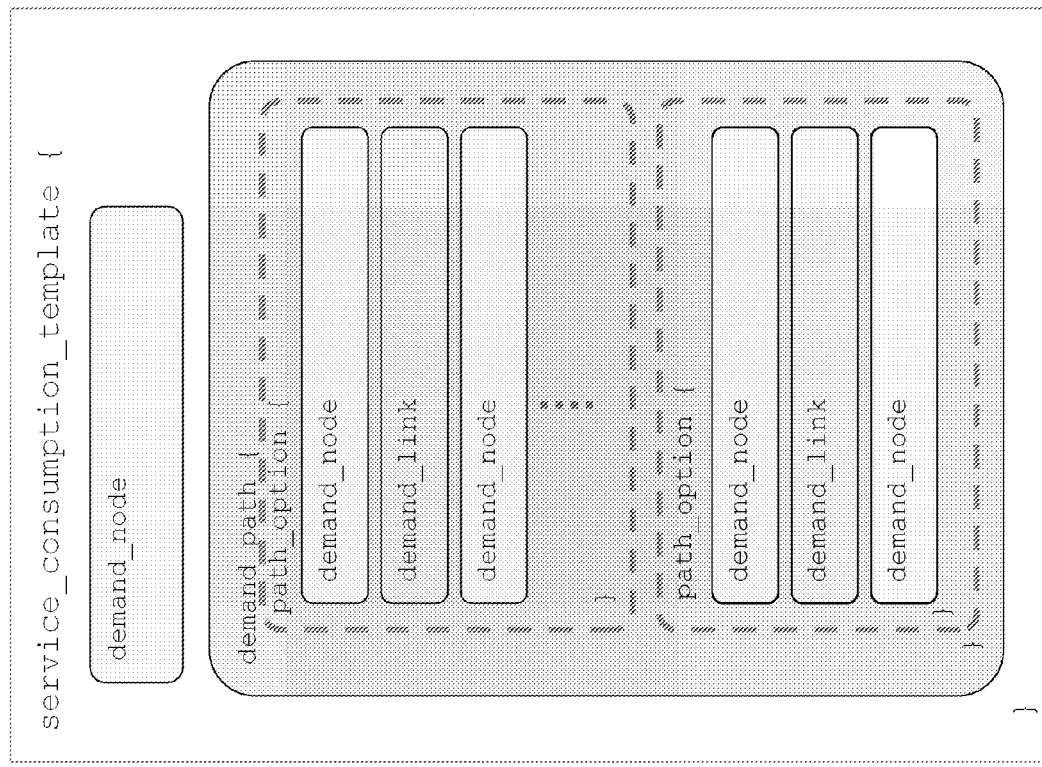

The resultant network definition includes data on the network topology and its capacity and also consumption requirements of services. A graphical example (which it will be appreciated that this is for illustration purposes and the actual definition will preferably be in a human and machine readable form such as a hierarchical structured language) is shown in FIG. 7. The "demand_path" parameter in the service consumption data allows the specification of an unknown service path that can be optimised during the optimisation process.

Once the network definition has been determined, either by creation of a fresh network representation or definition, obtaining a pre-created representation or definition or generation of a representation or definition from data from other systems or data sources (such as an inventory, dump from a network analyser etc), it can then be used as the basis for optimisation and/or scenario exploration.

Referring back to the network representation of FIGS. 2 and 3. Assume the scenario to be optimised here is to identify the optimal service route from start node 100 to destination node 110. The first path 140 is the shorter route and the second path 141 is the longer route with more links/nodes to be consumed. The relative fitness of a particular solution is calculated based preferably on capacity consumption of the service route along a selected path and also on how well constraints have been met.

It would be expected that the first path 140 would have a greater fitness as it is the simpler route. However, if intermediate node 120 had insufficient current available capacity and infill capacity was required to be populated in order to meet the needs of the service route, this would add to cost and may reduce the solution's fitness.

In order to identify an optimal solution, the optimisation component 50 is utilised. The optimisation component 50 processes the network definition in dependence on one or more predetermined optimisation criteria to optimise the network definition based on the optimisation criteria and on the capacity criteria.

Various optimisation criteria may be applied. This typically involves finding the most efficient solution but may also include conditions such as using existing capacity before allocating infill capacity (ie. use current inventory before buying more). It will be appreciated that the cost of a solution will often not be the financial cost. For example, organisations may consider performance as a factor of "cost" and a lower performing solution that does not require capital expenditure may be preferred over one in which capital expenditure is required to produce a more efficient solution.

In a preferred embodiment, optimisation is performed by use of an evolution engine. Embodiments of the present invention are not dependent on use of a particular evolution engine or evolution engine type, although a genetic algorithm based engine is preferred. In one embodiment, an interface or wrapper may be provided to enable any selected optimisation engine or system to be used.

When determining capacity to be consumed, 'free' capacity is normally selected if available (as this represents capacity available in existing infrastructure/equipment). If such 'free' capacity is not available within the inventory tree of a topology element, then 'infill' capacity, if available, will be selected for consumption. In consuming 'infill', the optimization component will eventually cause creation of a new inventory/capacity and subsequent instantiation of capacity/inventory by purchase of the component, enabling of the port etc.

For instance, in placing 9×1 G Ethernet (GE) services let's say 1×10 GE links are expected to be created. Services to consume the required capacity are processed in turn. The first 1 GE service is placed by consuming a 10 GE 'infill' link capacity (i.e., 10 GE link is instantiated by connection to a port). The instantiated link will be treated by the rest of the services as an existing 10 GE link with available 9×1 GE 'free' capacity, which is enough to place the remaining 8×1 GE services.

Free capacity/Infill control can optionally be done by evolution engine 60 if desired. In such a situation, the evolution engine could assist in determining best selection of available or infill capacity. For example, it may be that two different links are available to provide infill for the GE services discussed in the example above and the evolution engine can assist in determining knock-on effects of selecting one over the other. Similarly, it can be envisaged that there may be exceptional situations where infill may be preferable over available capacity such as where two different services compete for the same available capacity (perhaps of a more generic topology element that can support many different service types) but that the infill available to satisfy one of the two services is more costly or perhaps is non-existent.

Figure 8:
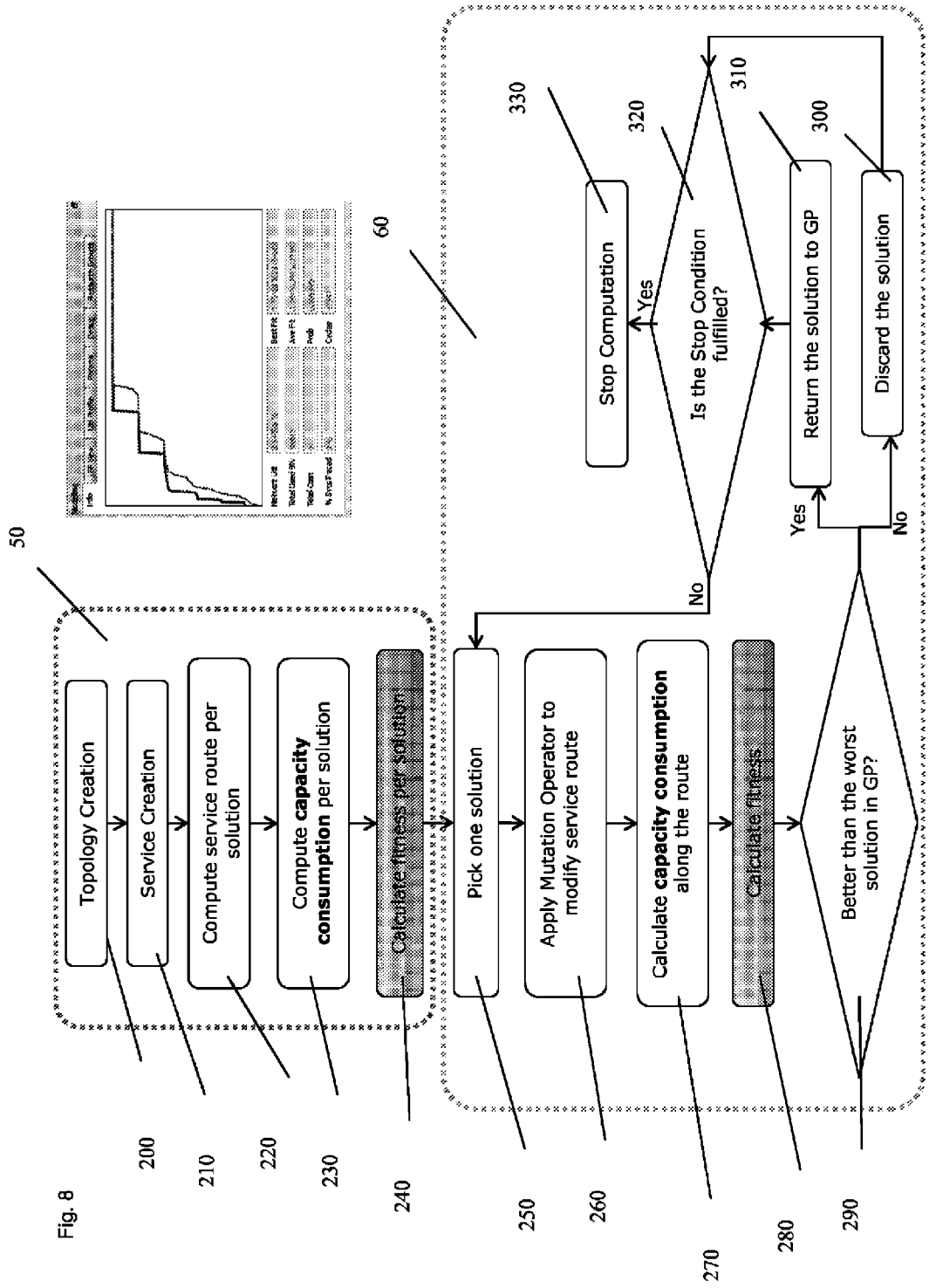
FIG. 8 is a flow diagram of the overall process including steps performed by the optimisation component.

FIG. 8 is a flow diagram of the overall process including steps performed by the optimisation component 50.

In steps 200 and 210, the network definition is created (or otherwise obtained) as discussed above. In step 220, the network definition is then used to generate a predetermined number of seed solutions to the scenario. For each seed solution, a possible service route is computed by the evolution engine. The number of seed solutions generated is user configurable based on the particular scenario, the evolution engine and other factors.

For each seed solution, steps 230 and 240 are then executed. In step 230, capacity consumed by the service route is computed by cross-referencing with the network definition and its stored capacity data. A fitness value is then calculated using a fitness function in step 240. Preferably, the fitness function for a solution returns a relative value based on the capacity consumption and on any other specified optimisation criteria.

The fitness function may in one embodiment return a score between 0 and 1. An optimal score being 1 and a poor score being 0 (or vice versa if required). The score returned by the fitness function may be determined based on weightings applied to the service route taking into account conditions required by the scenario or optimisation.

An example fitness function may be:

Solution_Fitness=$F$(fit_routing,fit_capacity)

Where:
fit_routing=fitness value contribution based on routing constraints
fit_capacity=fitness value contribution based on capacity consumption constraints There may be a plurality of different fitness functions that may be selected based on scenario/optimisation requirements. In such circumstances, a fitness function could be applied in isolation or a combination of different fitness functions could be applied to calculate a solution's fitness score. Where a number of different fitness functions are applied in combination, the fitness score could be averaged or may be calculated based on some predetermined weightings determined in dependence on relative importance of the respective function. Example fitness functions may include a Cost Fitness Function, a Utilisation Fitness Function, a Delay Fitness Function, a Speed Fitness Function, an Efficiency Fitness Function etc.

The pool of seed solutions are then processed iteratively in steps 250-330 in conjunction with the evolution engine 60.

In step 250, a candidate solution is selected from the pool and a mutation operator is applied in step 260 to modify the solution's service route. The mutated candidate solution is then subjected to capacity consumption computation and fitness calculation in steps 270 and 280.

In step 290, the fitness of the mutated (off-spring) solution is compared to that of the other solutions in the pool. If the fitness of the mutated solution is the same or worse than the fitness of the worst fitness solution in the pool, the mutated solution is discarded in step 300. If the fitness is better, the mutated solution is stored in the pool in step 310. Preferably, the pool size is fixed. In such an arrangement, the lowest fitness solution is dropped when a new solution is stored. Assuming the parent is not the lowest fitness, both parent and child would be stored in the pool.

The process then iterates through steps 250 to 320 until a stop condition is fulfilled in step 320 at which point one or more of the solutions from the pool are returned in step 330. Preferably, the solution having the best fitness is returned, although depending on configuration, runner-up and possibly all solutions may be returned.

The mutation applied by the evolution engine 60 to a candidate solution in step 260 may be randomly selected or selected in some controlled manner from a predetermined set. An exemplary predetermined set may include functions to: "Fix", "Compute", "Modify" or "Select".

If the function is "Fix", then no action is performed, since the candidate solution is fixed. If the command is "Compute" then a computation is performed in order to optimise the candidate solution. If the command is "Modify" then candidate solution is modified, for example the evolution engine may modify the topology and/or the services and/or the interconnects of the candidate. If the command is "Select" then the evolution engine selects (randomly) a different candidate solution from the pool.

It will be appreciated that processing need not be performed serially and processing of different candidate solutions could be performed in parallel.

The process of evolving the pool of solutions is preferably performed numerous times such that pool converges towards the most optimal solutions to the scenario. The stop condition monitored by step 320 may be a lack of improvement of fitness score over a predetermined number of iterations, expiration of a predetermined time period, generation of a solution having a fitness over a predetermined threshold etc.

Constraints that may be applied to the optimisation process are preferably divided into two types: hard constraints and soft constraints. If a hard constraint fails, a service fails and so the solution will have very low fitness value. Soft constraints on the other hand will be worked on in a 'best effort' manner; with 'minimise cost' constraint the solution cost will improve during the evolution stage, resulting the optimum solution at the end of computation.

Example routing hard constraints may include: use minimum bandwidth, disjoint, limit delay below a threshold value. Example routing soft constraints may include: minimise cost, minimise delay etc. Example capacity hard constraints may include capacity disjointedness and minimum use of particular elements. Example capacity soft constraints may include minimise cost.

Figure 9:
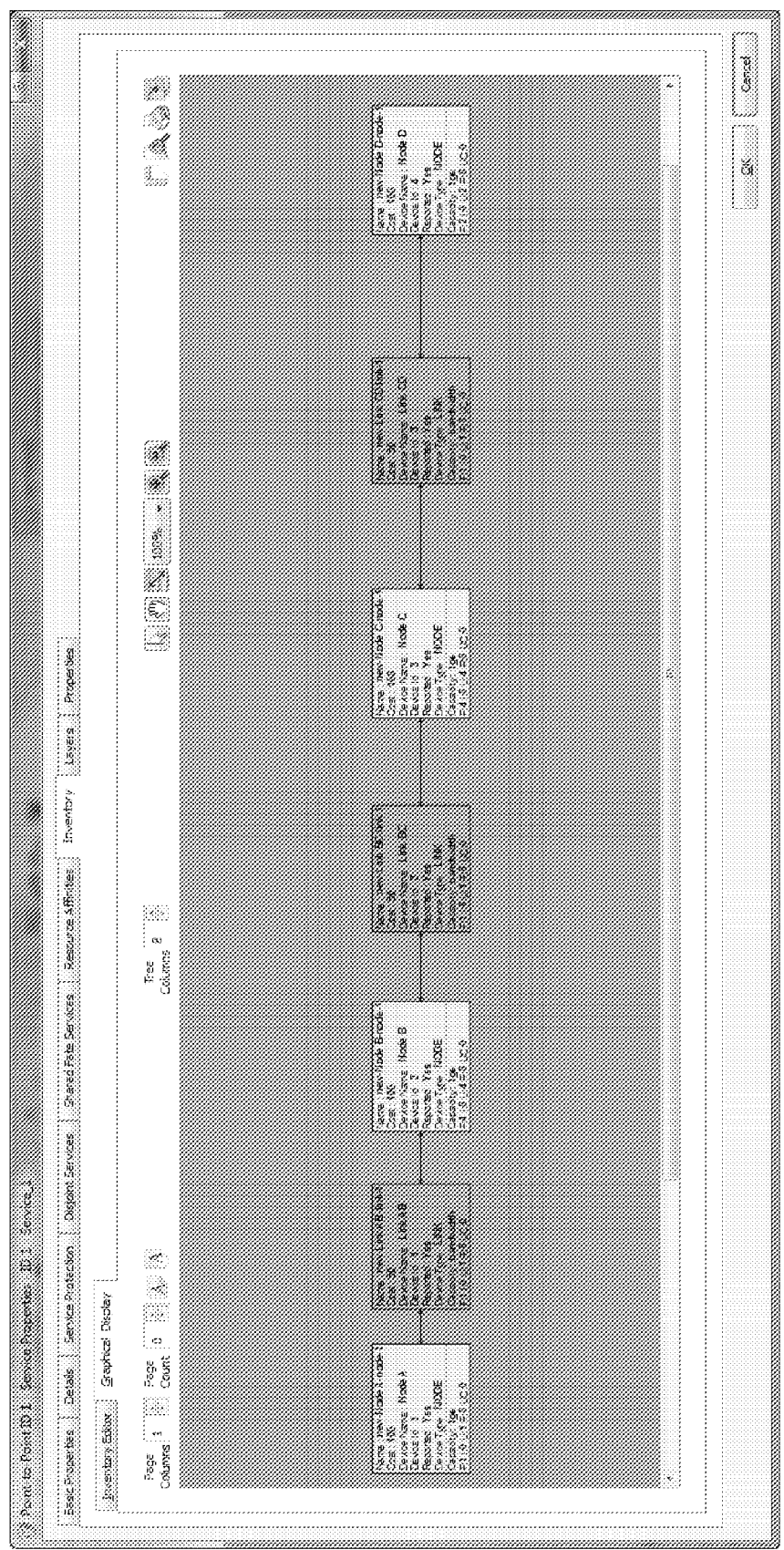
FIG. 9 is an example graphical output produced by an embodiment of the present invention.

In preferred embodiments, the returned solution could be provided or translated so as to provide an output such as a report; an inventory of required topology elements and their configuration; commands, scripts or configuration files that can be applied to topology elements or other components of a network such as a network management system to cause configuration of the network or in some other form. An example graphical output is shown in FIG. 9. Other reports may include: details of the final solution potentially from different perspectives of the solution; link utilisation, newly created devices, etc. These reports and their format can be tailored according to customers' needs.

It will be appreciated that there are many variations in which capacity could be consumed. In a preferred embodiment, these are specified in the service element templates as "select" options. Example select options may include:
Consume capacity from all specified
Consume the least cost of the options
Consume from first available one
Consume the most utilised Select options may be used to identify the level at which a select option can be specified:
Selecting which child topology element should be used
Selecting which template demand set should be used
Selecting which topology element should be used
Selecting which path option is to be used The reason select options are used in preferred embodiments is to guide optimization based on capacity consumption requirements.

Select options can therefore provide guidance. For instance, when one parent topology element has more than one child topology element, the 'select' option can be specified so as to cause consumption of capacity from a particular child. In a straight forward scenario/network, when 'LEAST_COST' is specified, the optimisation component can randomly select capacity to consume from the various options and then evaluate the solution based on the fitness value. In another iteration, a different random choice may be made and eventually an optimal solution would be discovered.

However, complex networks or ambitious scenarios may apply the 'LEAST_COST' select option is used at various locations (e.g., demand node (DN), demand link (DL) 'demand_path' and etc.) as well as at various levels of topology element hierarchy. Suddenly, the solution space to be explored for optimisation will be huge in view of the number of different combinations of all possible options.

Such a decision space cannot be practically explored with pure randomness. Indeed, the number of services have not even been taken into account here, and would expand the solution space to be explored even further.

Figure 11:
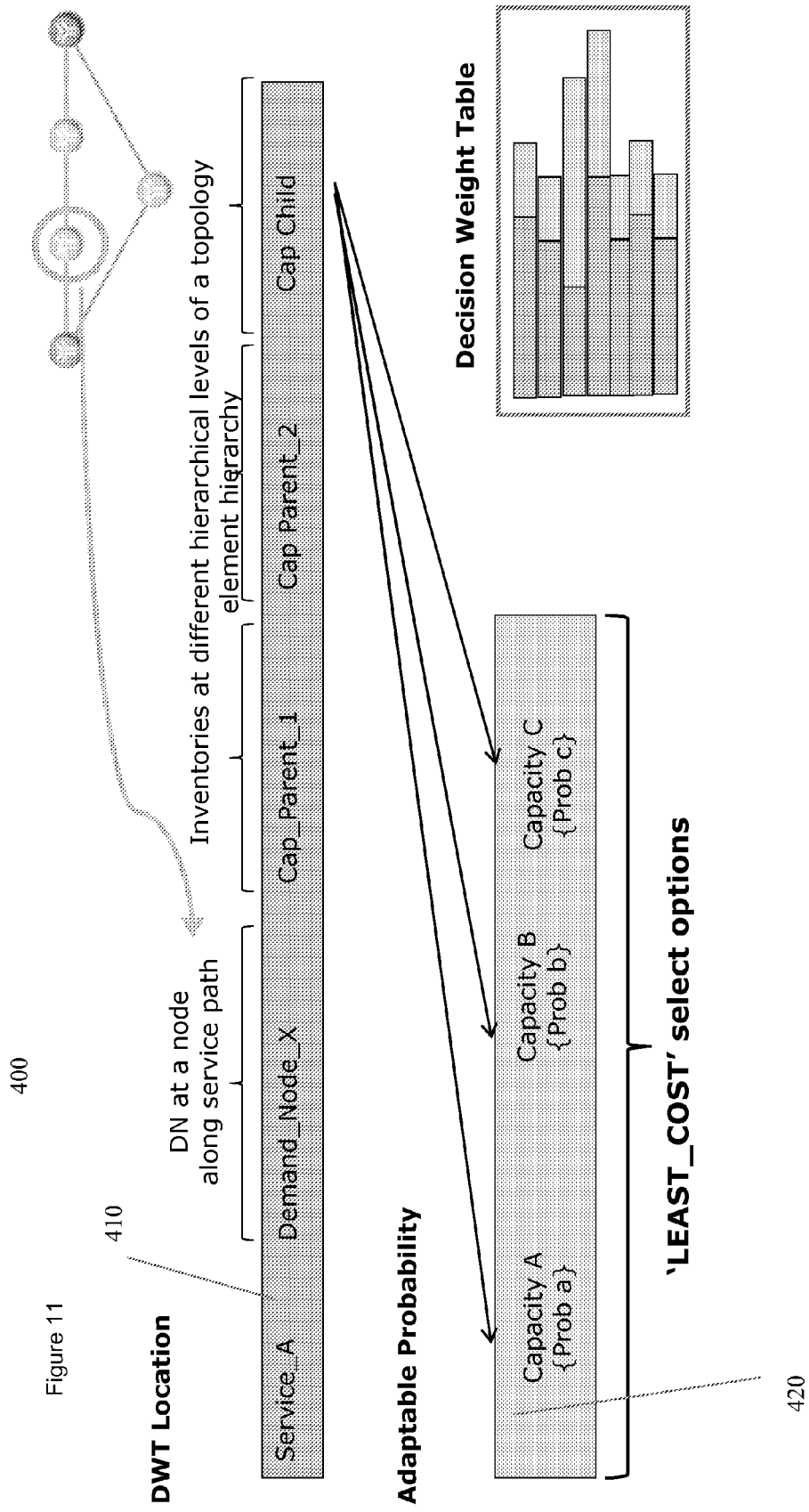
Figure 12:
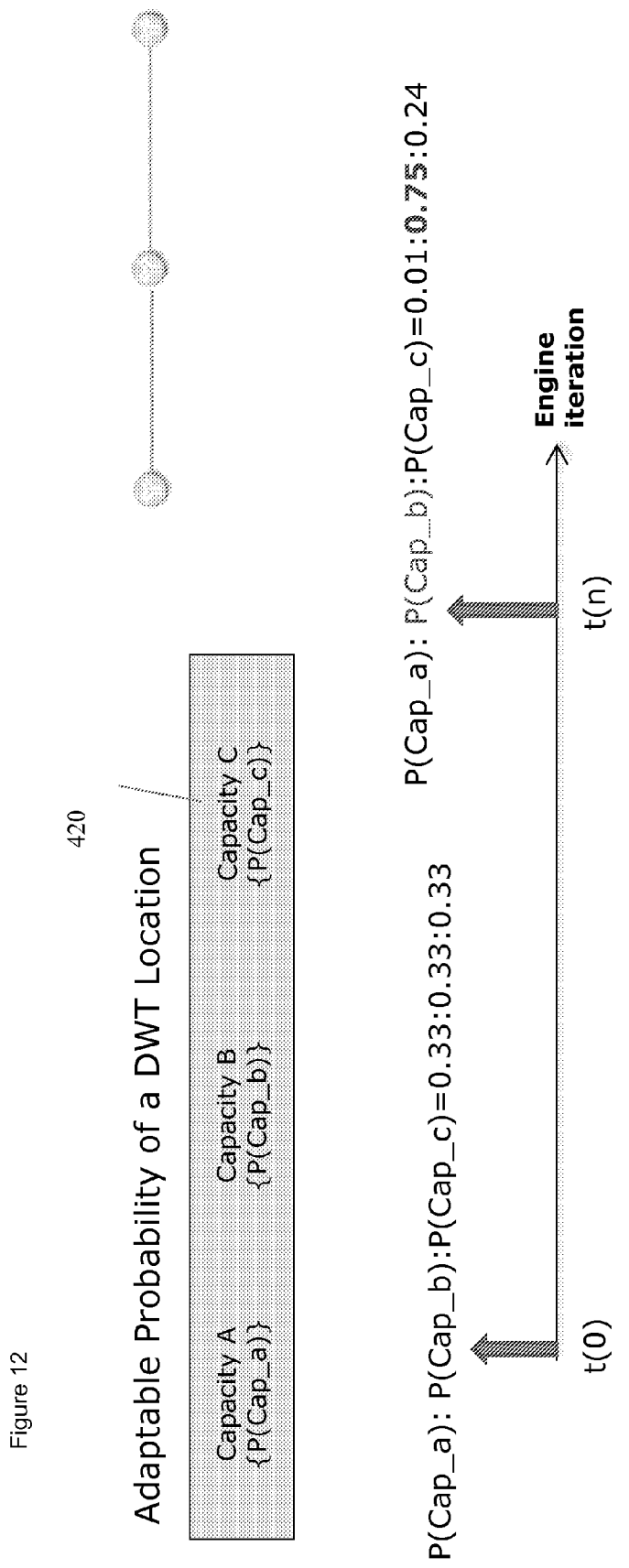

It will be appreciated that the optimisation component cannot know which option is the least cost until capacity consumption and fitness value is calculated. In a preferred embodiment of the present invention, a decision weight table is maintained to at least partially address this issue. A schematic diagram illustrating application of a decision weight table is shown in FIGS. 11 and 12.

Figure 10:
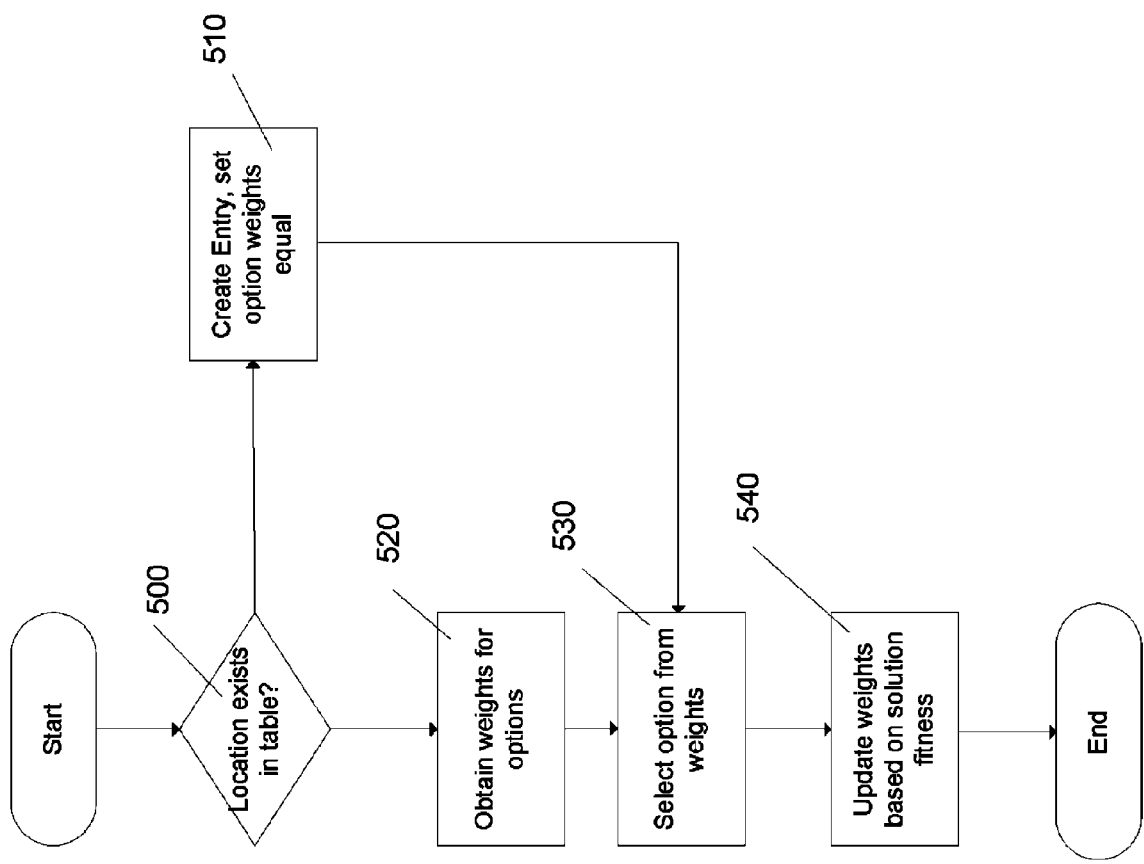
FIG. 10 is a flow diagram illustrating steps taken in one embodiment of the present invention; and, FIGS. 11 and 12 are illustrations of a decision weight table used in preferred embodiments of the present invention.

The decision weight table 400 records past selections and their calculated fitnesses in order to assist the optimization component select an appropriate option where the "least_cost" option is specified for a multiple choice situation. The process followed is shown in FIGS. 10 to 12. In FIGS. 11 and 12, an example situation is illustrated whilst in FIG. 10, the general process is shown.

When presented with a "least_cost" choice between multiple options, the optimisation component checks a decision weight table 400 in step 500. If this is the first time the "least_cost" situation has been encountered at this location then the "DWT location" table 410 of the decision weight table will not be already populated for the location and a new entry is created in the table in step 510 with all options 420 specified as having the same probability. If the situation has been encountered before, an entry in the "DWT location" table 410 will be found in step 520 and will have recorded probabilities for the options. In step 530, an option is selected based on their respective probabilities (preferably the highest probability is selected). Where two or more options share the highest probability, one of the options is randomly selected. In step 540, after the candidate solution has been evaluated and a fitness value calculated, the decision weight table is re-visited and the probability for the selected option and other options are updated based on the calculated fitness.

As such, a weighting table is maintained to provide a degree of "memory" to the optimisation process such that future option selections can benefit from the outcome of past selections.

Each entry in the decision weight table is preferably labelled with a location that is a composite of the hierarchy of service, DN/DLs and capacities. In this manner, the location is not a physical location but is instead a unique identifier of the location in the network and state of topology elements, capacities etc. This enables the system to uniquely identify the location where the option choice is made and know when that same location is re-visited.

In the example shown in FIGS. 11 and 12, the location is the lowest hierarchical inventory within a topology element hierarchy that is consumed by a DN (out of possibly multiple DN choices), the topology element corresponding to a node along the service path.

The number of decision weight table entries will depend on where and how many 'LEAST_COST' select options are specified in a network definition.

In the illustrated decision weight table, there are three choices for a capacity to be consumed.

For an instance, at the first engine iteration (at t(0) in FIG. 12), the location has not yet been encountered and there is no entry in the table nor any associated probabilities. Therefore, a location entry is created in the table when a 'LEAST_COST' select option is performed. At this stage, probabilities assigned to the choices are even. As solutions evolve, according to the fitness values of different solution of different choices each probability is adjusted, and so the optimisation component can make a better choice for a capacity when it next encounters the particular location.

Although the various embodiments disclosed above refer to simulation of networks, it will be appreciated by the skilled reader that the inputs to the simulation may be data modelled, measured or otherwise captured from a network(s), layer(s) or system(s). Additionally, it will be appreciated that the path or paths generated by the simulation may be manually or automatically applied to the networks, layers or systems. For example, a path that scores the highest on a fitness function may be used to generate commands, scripts or other updates that can then be applied to routing nodes or other controllable entities or systems. In one embodiment, a simulation system may be interfaced or within a multi-layer network such that it obtains data on the network to derive the nodes and links. Once a population of paths have been evolved, one or more of the paths may be automatically applied to the network or its components. For example, the network may be a data communications network and the simulation system is used to determine best routes under certain loading or failure situations. Having identified optimal loading or failure tolerant routes, the simulation system in this embodiment would be arranged to update configuration of one or more routers in the network to take into account the optimal route or routes.

As stated above, the exemplary apparatus and methods build a reusable model for a system/network that can be used in order to determine the "best" solution for a route across the network, the best solution being a population of paths across the network, (selected from a plurality of populations of paths) based on objective functions. One useful category of objective functions is "fitness tests", the population of paths having the highest fitness being considered to be the "best" solution. The best solution may be classified as the population of paths having the shortest length, and/or the lowest cost, and/or the greatest speed etc., depending on the requirements of the network and service. Multiple requirements (e.g. distance, cost, and speed etc.) may be applied in order to determine the best solution. For example, if the requirement is cost, then the best solution based on cost alone may be a population of paths A (which is very cheap but also slow), whereas if the requirements are cost and speed, then the best solution may be a population of paths B (which is more expensive than population of paths A, but also faster than population of paths A), so a best solution for the combination of cost and speed.

The network capacity management system as described herein may be implemented in various forms including on a computer, a server or as part of a distributed application across a network. Furthermore, the system may be integrated with or interfaced to network management systems, hardware such as routers, switches and the like, provisioning systems and other hardware and software based systems for management of networks. It will furthermore be appreciated that the evolution engine need not be part of the network capacity management system and could be implemented as a separate component or may be an existing system, unit or component that is interfaced to over linked over a data communication network or the like.

As such, at least a portion of the embodiment described herein may be performed by a process defined by code executing within a processor of a computer. The code can comprise software instructions that are provided to a physical memory that is accessible to the processor of the computer. The code can be arranged as firmware or software, and can be organized as a set of modules such as discrete code modules, function calls, procedure calls or objects in an object-oriented programming environment. If implemented using modules, the embodiment can comprise a single module or a plurality of modules that operate in cooperation with one another.

Those skilled in the art will appreciate that while the foregoing has described what is considered to be the best mode and, where appropriate, other modes of performing the invention, the invention should not be limited to the specific configurations and methods disclosed in this description of the preferred embodiment, those skilled in the art will recognise that the invention has a broad range of applications, and that the embodiments may take a wide range of modifications without departing from the inventive concept as defined in the appended claims.

While disclosed in the preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art.

The present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

The invention claimed is:

1. A network capacity management system comprising:
a first data repository encoding topology definition data, the topology definition data comprising data on topology elements of a network and including data on capacity of a respective topology element;
a second data repository encoding service consumption data, the service consumption data comprising data on service elements associated with a network and including data on capacity requirements associated with a respective service element;
a processor configured to execute computer program code for executing a network definition component, including computer program code configured to generate a network definition from the topology definition data and the service consumption data, the network definition encoding capacity criteria determined from said data on capacity of the respective topology elements and from data on capacity requirements of the respective service elements;
a processor configured to execute computer program code for executing an optimisation component, including computer program code configured to process said network definition in dependence on one or more predetermined optimisation criteria to optimise said network definition based on said optimisation criteria and on said capacity criteria;
wherein the optimisation component includes an evolution engine configured to apply a selected one of a neural network, genetic programming or a genetic algorithm to optimise the network definition, the optimisation component is configured to calculate a fitness value for the network definition for each evolution of the evolution engine, and the evolution engine is configured to perform subsequent optimisation of the network definition in dependence on said fitness value.

2. A network capacity management system according to claim 1, wherein:
the topology definition data includes data on constraints associated with a respective topology element and the service consumption data includes data on constraints associated with a respective service element,
the network definition component being configured to encode constraint criteria in said network definition, the constraint criteria being determined from said data on constraints on the respective topology and service elements, and,
the optimisation component being configured to process said network definition to optimise said network definition based on constraint criteria.

3. A network capacity management system as claimed in claim 1, further comprising a scenario definition component configured to receive inputs on a scenario, wherein the optimisation component is configured to process the network definition in dependence on the scenario.

4. A network capacity management system of claim 1, wherein the optimisation component includes an interface configured to communicate with the evolution engine to optimise the network definition.

5. A network capacity management system as claimed in claim 1, wherein the fitness value is calculated in dependence on said optimisation criteria and on said capacity criteria.

6. A network capacity management system as claimed in claim 1, wherein the network definition component is configured to determine a network representation from said topology and service elements.

7. A network capacity management system as claimed in claim 6, wherein the network definition component is arranged to receive inputs from a user via a graphical user interface for selecting at least a subset of the topology and service elements for the network representation.

8. A network capacity management system as claimed in claim 1, wherein the data on capacity includes one or more of data on existing capacity, data on utilised existing capacity, and data on infill capacity, infill capacity comprising capacity creatable by allocation of a resource.

9. A network capacity management system as claimed in claim 1, wherein the service consumption data includes data on routing requirements associated with a respective service element, the optimisation component being configured to optimise said network definition in dependence on said routing requirements.

10. A network capacity management system as claimed in claim 1, wherein the network definition includes a route utilising at least selected ones of the topology elements and being associated with a respective service element, the optimisation component being configured to optimise said route in dependence on said optimisation criteria and on said capacity criteria.

11. A network capacity management system as claimed in claim 1, wherein the topology definition data for a topology element comprises a hierarchy of topology definition data for each of one or more child topology elements, each child topology element comprising a sub-element of the topology element, said hierarchy encoding dependencies between the respective elements in the hierarchy.

12. A network capacity management system as claimed in claim 1, wherein the topology definition data includes data defining relationships between non-hierarchically linked topology elements.

13. A network capacity management system comprising:
- a first data repository encoding topology definition data, the topology definition data comprising data on topology elements of a network and including data on capacity of a respective topology element;
- a second data repository encoding service consumption data, the service consumption data comprising data on service elements associated with a network and including data on capacity requirements associated with a respective service element;
- a processor configured to execute computer program code for executing a network definition component, including computer program code configured to generate a network definition from the topology definition data and the service consumption data, the network definition encoding capacity criteria determined from said data on capacity of the respective topology elements and from data on capacity requirements of the respective service elements;
- a processor configured to execute computer program code for executing an optimisation component, including computer program code configured to process said network definition in dependence on one or more predetermined optimisation criteria to optimise said network definition based on said optimisation criteria and on said capacity criteria, wherein the optimisation component includes an evolution engine configured to apply a selected one of a neural network, genetic programming or a genetic algorithm to optimise the network definition; and
- a memory encoding data on decision weighting;
- the network capacity management system being arranged to record, for evolutions of said evolution engine, an optimisation selected in for evolution and a weighting value determined in dependence on a fitness value calculated for said optimised network definition for said evolution, the optimisation component being arranged to direct subsequent optimisation of the network definition by said evolution engine in dependence on said weighting value.

14. At least one non-transitory computer-readable medium having processor-readable program code embodied therein, the processor-readable program code adapted to be executed by a processor to implement a capacity computation engine configured to interface with a network optimisation evolution engine, the network optimisation evolution engine optimising a network definition for the network by iterative evolution of the network definition, the capacity computation engine comprising:
- a network definition component configured to generate the network definition for the network from data on topology elements and service requirements of said network, the network definition component being arranged to encode, in said network definition, capacity data in dependence on capacity of the respective topology elements and on capacity requirements of the respective service elements;
- a network capacity computation component configured, for each iterative evolution of the evolution engine, to calculate a fitness value of the evolved network definition and to direct subsequent operation of said evolution engine in dependence on said fitness value.

15. A network analysis method comprising:
- storing topology definition data, the topology definition data comprising data on topology elements of a network and including data on capacity of a respective topology element;
- storing service consumption data, the service consumption data comprising data on service elements associated with a network and including data on capacity requirements associated with a respective service element;
- generating a network definition defining the network, the network definition being generated from the topology definition data and the service consumption data, the network definition encoding capacity criteria determined from said data on capacity of the respective topology elements and from data on capacity requirements of the respective service elements;
- determining a service route across the network;
- cross-referencing the service route with the network definition to determine consumption of said capacity by said service route;
- applying a selected one of a neural network, genetic programming or a genetic algorithm to optimise the service route over a number of evolutions in dependence on capacity consumption;
- calculating a fitness value for the network definition for each evolution; and
- performing subsequent optimisation in dependence on said fitness values.

16. A method according to claim 15, wherein:
the topology definition data includes data on constraints associated with a respective topology element and the service consumption data includes data on constraints associated with a respective service element,
the method further comprising:
- determining constraint criteria from said data on constraints on the respective topology and service elements;
- encoding said constraint criteria in said network definition; and,
- processing said network definition to optimise said network definition based on said constraint criteria.

17. A method according claim 15, further comprising:
- recording, for said evolutions, an optimisation selected for said evolution and a weighting value determined in dependence on a fitness value calculated for a result of said optimisation; and,
- directing subsequent evolutions in dependence on said weighting value.

* * * * *